(12) United States Patent
DiGirolamo et al.

(10) Patent No.: US 8,902,763 B2
(45) Date of Patent: Dec. 2, 2014

(54) METHOD AND APPARATUS FOR HIGH SPEED DOWNLINK PACKET ACCESS LINK ADAPTATION

(75) Inventors: Rocco DiGirolamo, Laval (CA); Paul Marinier, Brossard (CA); Christopher R. Cave, Verdun (CA)

(73) Assignee: InterDigital Technology Corporation, Wilmington, DE (US)

( * ) Notice: Subject to any disclaimer, the term of this patent is extended or adjusted under 35 U.S.C. 154(b) by 293 days.

(21) Appl. No.: 12/048,797

(22) Filed: Mar. 14, 2008

(65) Prior Publication Data

US 2008/0225744 A1   Sep. 18, 2008

Related U.S. Application Data

(60) Provisional application No. 60/895,385, filed on Mar. 16, 2007.

(51) Int. Cl.
| | | |
|---|---|---|
| *G01R 31/08* | (2006.01) | |
| *G06F 11/00* | (2006.01) | |
| *H04W 28/18* | (2009.01) | |
| *H04W 74/08* | (2009.01) | |
| *H04W 48/16* | (2009.01) | |

(52) U.S. Cl.
CPC .............. *H04W 28/18* (2013.01); *H04W 74/08* (2013.01); *H04W 48/16* (2013.01)
USPC .......................................................... 370/252

(58) Field of Classification Search
USPC .......................................... 370/252, 248, 235
See application file for complete search history.

(56) References Cited

U.S. PATENT DOCUMENTS

| | | | |
|---|---|---|---|
| 6,985,457 B2 * | 1/2006 | Zeira et al. .................... 370/318 |
| 7,089,029 B2 * | 8/2006 | Cao et al. ....................... 455/522 |
| 7,403,745 B2 * | 7/2008 | Dominique et al. ........ 455/67.11 |
| 7,539,207 B2 * | 5/2009 | Frederiksen et al. .......... 370/465 |
| 7,760,683 B2 * | 7/2010 | Ishii et al. ...................... 370/328 |
| 2003/0119452 A1 | 6/2003 | Kim et al. |
| 2004/0043798 A1 * | 3/2004 | Amerga et al. ............... 455/574 |
| 2004/0152458 A1 | 8/2004 | Hottinen |
| 2005/0070319 A1 * | 3/2005 | Pedersen ........................ 455/515 |
| 2005/0239410 A1 * | 10/2005 | Rochester, III ............. 455/67.11 |
| 2006/0252377 A1 * | 11/2006 | Jeong et al. ................. 455/67.13 |
| 2007/0030830 A1 * | 2/2007 | Sagne et al. .................. 370/336 |

(Continued)

FOREIGN PATENT DOCUMENTS

| | | |
|---|---|---|
| EP | 1467582 | 10/2004 |
| EP | 1 511 247 | 3/2005 |

(Continued)

OTHER PUBLICATIONS

Universal Mobile Telecommunications Systems (UMTS); Physical Layer; Measurements (FDD) (3GPP TS 25.215 version 4.;3.0 Release 4), Dec. 2001, Technical specification, whole document.*

(Continued)

*Primary Examiner* — Thai Hoang
*Assistant Examiner* — Maharishi Khirodhar
(74) *Attorney, Agent, or Firm* — Theodore Naccarella (57) ABSTRACT

A method of high speed downlink packet access (HSDPA) link adaptation, comprises receiving a channel quality measurement metric over a Measured Results on random access channel (RACH) information element (IE). The link is adapted based upon the received channel quality metric.

17 Claims, 3 Drawing Sheets

(56) References Cited

U.S. PATENT DOCUMENTS

| | | | |
|---|---|---|---|
| 2007/0047493 A1* | 3/2007 | Park et al. | 370/331 |
| 2007/0254679 A1* | 11/2007 | Montojo et al. | 455/458 |
| 2008/0076359 A1* | 3/2008 | Charpentier et al. | 455/63.1 |

FOREIGN PATENT DOCUMENTS

| | | |
|---|---|---|
| EP | 1511247 | 3/2005 |
| EP | 1 720 373 | 11/2006 |
| EP | 1720373 | 11/2006 |
| JP | 2007-511166 | 4/2007 |
| WF | 2005/048529 | 5/2005 |
| WO | WO-2005/002114 | 1/2005 |
| WO | 2005/048466 | 5/2005 |
| WO | 2005/048529 | 5/2005 |
| WO | 2005/112299 | 11/2005 |

OTHER PUBLICATIONS

Universal mobile telecommunications systems (UMTS); High speed downlink packet access (HSDPA); overall description, stage 2, (3GPP TS 25.308 version 7.2.0 Release 7), Mar. 2007, Technical specification, whole document.*

3GPP TS 25.331 V3.21.0 (Dec. 2004), entire document, release 1999.*

Third Generation Partnership Project, "Technical Specification Group Radio Access Network; Requirements for support of radio resource management (FDD) (Release 6)," 3GPP TS 25.133 V6.20.0 (Dec. 2007).

Third Generation Partnership Project, "Technical Specification Group Radio Access Network; Physical Layer Procedures (FDD) (Release 7)." 3GPP TS 25.214 V6.11.0 (Dec. 2006).

Third Generation Partnership Project, "Technical Specification Group Radio Access Network;Requirements for support of radio resource management (FDD) (Release 6)," 3GPP TS 25.133 V6.20.0 (Dec. 2007).

Third Generation Partnership Project, "Technical Specification Group Radio Access Network; Requirements for support of radio resource management (FDD) (Release 7)," GPP TS 25.133 V7.10.0 (Dec. 2007).

Third Generation Partnership Project, "Technical Specification Group Radio Access Network; Requirements for support of radio resource managment (FDD) (Release 8)," 3GPP TS 25.133 V8.1.0 (Dec. 2007).

Third Generation Partnership Project, "Technical Specification Group Radio Access Network; High Speed Downlink Packet Access (HSDPA); Overall Description; Stage 2 (Release 8)" 3GPP TS 25.308 V8.0.0 (Jan. 2008).

Third Generation Partnership Project, "Technical Specification Group Radio Access Network; Requirements for support of radio resource managment (FDD) (Release 6)," 3GPP TS 25.133 V6.16.0 (Dec. 2006).

Third Generation Partnership Project, "Technical Specification Group Radio Access Network; Requirments for support of radio resource management (FDD) (Release 8)," 3GPP TS 25.133 V8.1.0 (Dec. 2007).

Third Generation Partnership Project, "Technical Specification Group Radio Access Network; Physical layer—Measurements (FDD)(Release 7)", 3GPP TS 25.215 V7.1.0 (Oct. 2006).

Third Generation Partnership Project, "Technical Specification Group Radio Access Network; Requirements for support of radio resource management (FDD) (Release 6)," 3GPP TS 25.133 V6.16.0 (Dec. 2006).

Third Generation Partnership Project, "Technical Specification Group Radio Access Network; Requirements for support of radio resource management (FDD) (Release 7)," 3GPP TS 25.133 V7.6.0 (Dec. 2006).

"Enhanced CELL-FACH State in FDD", RP-060606, (Sep. 25, 2006).

"Universal Mobile Telecommunications System (UMTS); High Speed Downlink Packet Access (HSDPA); Overall description; Stage 2 (3GPP TS 25.308 version 7.2.0 Release 7)," ETSI TS 125 308 V7.2.0 (Mar. 2007).

Ericsson, "Transport Channel for enhanced CELL_FACH," 3GPP TSG RAN WG2 #56bis, R2-070032 (Jan. 15-19, 2007).

Third Generation Partnership Project, "Technical Specification Group Radio Access Network; Physical layer—Measurements (FDD)(Release 6)", 3GPP TS 25.215 V6.4.0 (Sep. 2005).

Third Generation Partnership Project, "Technical Specification Group Radio Access Network; Physical layer—Measurements (FDD)(Release 7)", GPP TS 25.215 V7.1.0 (Oct. 2006).

Third Generation Partnership Project, "Technical Specification Group Radio Access Network; Physical layer—Measurements (FDD)(Release 7)", 3GPP TS 25.215 V7.4.0 (Dec. 2007).

Third Generation Partnership Project, "Technical Specification Group Radio Access Network; Physical layer—Measurements (FDD)(Release 4)", 3GPP TS 25.215 V4.3.0 (Dec. 2001).

Third Generation Partnership Project, "Technical Specification Group Radio Access Network; High Speed Downlink Packet Access (HSDPA); Overall Description; Stage 2 (Release 6)," 3GPP TS 25.308 V6.3.0 (Dec. 2004).

Third Generation Partnership Project, "Technical Specification Group Radio Access Network; High Speed Downlink Packet Access (HSDPA); Overall Description; Stage 2 (Release 6)," 3GPP TS 25.308 V6.4.0 (Apr. 2007).

Third Generation Partnership Project, "Technical Specification Group Radio Access Network; High Speed Downlink Packet Access (HSDPA); Overall Description; Stage 2 (Release 7)," 3GPP TS 25.308 V7.1.0 (Dec. 2006).

Third Generation Partnership Project, "Technical Specification Group Radio Access Network; High Speed Downlink Packet Access (HSDPA); Overall Description; Stage 2 (Release 7)," 3GPP TS 25.308 V7.5.0 (Jan. 2008).

Third Generation Partnership Project, "Technical Specification Group Radio Access Network; High Speed Downlink Packet Access (HSDPA); Overall Description; Stage 2 (Release 8)," 3GPP TS 25.308 V8.0.0 (Jan. 2008).

Third Generation Partnership Project, "Technical Specification Group Radio Access Network; Requirments for support of radio resource management (FDD) (Release 6)," 3GPP TS 25.133 V6.16.0 (Dec. 2006).

Third Generation Partnership Project, "Technical Specification Group Radio Access Network; Requirements for support of radio resource managment (FDD) (Release 6)," 3GPP TS 25.133 V6.20.0 (Dec. 2007).

Third Generation Partnership Project, "Technical Specification Group Radio Access Network; Requirments for support of radio resource management (FDD) (Release 7)," 3GPP TS 25.133 V7.6.0 (Dec. 2006).

Third Generation Partnership Project, "Technical Specification Group Radio Access Network; Requirements for support of radio resource management (FDD) (Release 7)," 3GPP TS 25.133 V7.10.0 (Dec. 2007).

Third Generation Partnership Project, "Technical Specification Group Radio Access Network; Requirements for support of radio resource management (FDD) (Release 8)," 3GPP TS 25.133 V8.1.0 (Dec. 2007).

Third Generation Partnership Project, "Technical Specification Group Radio Access Network; Radio Resource Control (RRC); Protocol Specification (Release 6)," 3GPP TS 25.331 V6.12.0 (Dec. 2006).

Third Generation Partnership Project, "Technical Specification Group Radio Access Network; Radio Resource Control (RRC); Protocol Specification (Release 6)," 3GPP TS 25.331 V6.16.0 (Jan. 2008).

Third Generation Partnership Project, "Technical Specification Group Radio Access Network; Radio Resource Control (RRC); Protocol Specification (Release 7)," 3GPP TS 25.331 V7.3.0 (Dec. 2006).

Third Generation Partnership Project, "Technical Specification Group Radio Access Network; Radio Resource Control (RRC); Protocol Specification (Release 7)," 3GPP TS 25.331 V7.7.0 (Jan. 2008).

(56) References Cited

OTHER PUBLICATIONS

Third Generation Partnership Project, "Technical Specification Group Radio Access Network; Radio Resource Control (RRC); Protocol Specification (Release 8)," 3GPP TS 25.331 V8.1.0 (Jan. 2008).
Third Generation Partnership Project, "Technical Specification Group Radio Access Network; Physical Layer Procedures (FDD) (Release 6)." 3GPP TS 25.214 V6.11.0 (Dec. 2006).
Third Generation Partnership Project, "Technical Specification Group Radio Access Network; Physical Layer Procedures (FDD) (Release 7)." 3GPP TS 25.214 V7.3.0 (Dec. 2006).
Third Generation Partnership Project, "Technical Specification Group Radio Access Network; Physical layer Procedures (FDD) (Release 7)." 3GPP TS 25.214 V7.7.0 (Dec. 2007).
Third Generation Partnership Project, "Technical Specification Group Radio Access Network; Physical Layer Procedures (FDD) (Release 8)." 3GPP TS 25.214 V8.0.0 (Dec. 2007).
"3rd Generation Partnership Project; Technical Specification Group Radio Access Network; High Speed Downlink Packet Access (HSDPA); Overall description; Stage 2 (Release 7)", 3GPP TS 25.308 V7.2.0, Mar 2007, 47 pages.
"European Search Report", European Application No. 13162555.0-1854, May 31, 2013, 9 Pages.
"Japanese Office Action", Japanese Application No. 2013-000702, Nov. 19, 2013, 2 Pages.
"Japanese Office Action (English Translation)", Japanese Application No. 2013-000702, Nov. 19, 2013, 2 Pages.
"Taiwan Office Action", Taiwan Application No. 101106608, Dec. 3, 2013, 6 Pages.
"Taiwan Office Action", Taiwan Application No. 097109399, Sep. 12, 2013, 8 Pages.
"Taiwan Office Action (English Translation)", Taiwan Application No. 101106608, Dec. 3, 2013, 4 Pages.
"Taiwan Office Action (English Translation)", Taiwan Application No. 097109399, Sep. 12, 2013, 5 Pages.
Ericsson, Nokia, "Stage 2 Updates for Enahnced Cell-Fach State in FDD", R2-071054; 3GPP TSG-RAN WG2 Meeting #57, St. Louis, Jun. 2, 2007, 10 Pages.
Ericsson, Nokia, "Stage 2 Updates for Enhanced Cell-Fach State in FDD", R2-071121; Change Request 25.308 CR 0019; 3GPP TSG-RAN WG2 Meeting #57; St. Louis, USA, Feb. 2007, 16 pages.
"Korean Office Action", Korean Application No. 10-2012-7004234, Jun 26, 2014, 5 pages.
"Korean Office Action (English Translation)", Korean Application No. 10-2012-7004234, Jun 26, 2014, 5 pages.
"Taiwan Office Action", Taiwanese Application No. 097109399, Jun 10, 2014, 5 pages.
"Taiwan Office Action (English Translation)", Taiwanese Application No. 097109399, Jun 10, 2014, 6 pages.
LG Electronics, "Channel Quality Reporting on RACH", 3GPP Tdoc R2-070526, 3GPP TSG-RAN WG2 Meeting #57, St. Louis, USA, Feb 15-19, 2007, 3 pages.
Nokia, "Stage 2 updates for Enhanced CELL_FACH state in Fm", 3GPP Tdoc R2-070393, Change Request, 25.308 CR CRNum V7.1.0, 3GPP TSG-RAN WG2 Meeting #56bis, Sorrento, Italy, Jan 15-19, 2007, 36 pages.

\* cited by examiner

METHOD AND APPARATUS FOR HIGH SPEED DOWNLINK PACKET ACCESS LINK ADAPTATION

CROSS REFERENCE TO RELATED APPLICATIONS

This application claims the benefit of U.S. Provisional Application No. 60/895,385, filed Mar. 16, 2007, which is incorporated by reference as if fully set forth.

FIELD OF INVENTION

This application is related to wireless communications.

BACKGROUND

High Speed Downlink Packet Access (HSDPA) is a feature that was introduced in Release 5 of the third generation partnership project (3GPP) specifications to operate in a cell dedicated channel (Cell_DCH) state. A key operating principle of HSDPA is to share a very fast downlink (DL) pipe, the high-speed downlink physical shared channel (HS-DPSCH). A universal terrestrial radio access network (UTRAN) can configure up to 15 HS-DPSCHs, and each of these can by shared by all wireless transmit/receive units (WTRUs) on a per transmission time interval (TTI) basis, (i.e., every 2 msec). As a result, the information on the downlink channels can be destined to different WTRUs at an interval of every 2 msec. In order to allow WTRUs to determine ownership of the information on these shared channels, a Node-B also sends a set of parallel high speed shared control channels (HS-SCCHs). Among other things, these channels provide details allowing the WTRUs to determine if the information on the HS-DPSCH is for them, and if so, to recover the transmitted information.

In HSDPA, the Node-B tries to make a better use of the downlink capacity by using several concepts, such as adaptive modulation and coding (AMC), retransmissions using a hybrid automatic repeat request (H-ARQ) scheme, and Node-B scheduling. All of these operate at a very fast rate, directed toward taking advantage of the changing channel conditions perceived by the WTRUs. In order to accomplish this, the Node-B schedules transmissions in order to maximize downlink throughput, (e.g., using 16-quadrature amplitude modulation (QAM) for a WTRU very close to the Node-B and using quadrature phase shift keying (QPSK) for a WTRU at cell edge). This fast scheduling is complemented with H-ARQ at a physical layer, allowing retransmission of transport blocks that are received in error. Furthermore, multiple simultaneous H-ARQ processes are permitted in order to maximize utilization.

Every 2 msec, the Node-B schedules transmissions on the HS-DPSCH based on WTRU channel conditions, the status of its own downlink buffers, and status of the parallel H-ARQ processes. In addition, the Node-B tailors the transmission bit rates to the specific WTRUs by adapting the modulation, coding, and transport block size. To achieve this, the Node-B requires the following information from the WTRUs:

Channel Quality Indication (CQI): an index into a table which provides the maximum MCS and transport block the WTRU can support, based on the received DL signal power, the interference from other cells, and the WTRU receiver capability; and Positive acknowledgement (ACK)/negative acknowledgement (NACK) feedback for the H-ARQ processes.

This feedback information is provided on a high speed dedicated physical control channel (HS-DPCCH). The CQI information is provided periodically, with periodicity determined by the UTRAN. The ACK/NACK information is only provided in response to a packet being received on the downlink. Some of the main attributes of the HS-DPCCH include:

Every WTRU having an access to the HSPDA has its own dedicated control channel and as a result the WTRU can easily provide the feedback information;

The channel is power controlled; this is accomplished through a closed loop mechanism using the downlink dedicated physical control channel (DPCCH), which always accompanies HSDPA transmission;

The information on the HS-DPCCH is heavily coded to aid in detection; and

The information on the HS-DPCCH is time aligned (but delayed) with respect to the UL DPCCH.

As part of Release 7 of 3GPP, using the high speed shared channel for WTRUs in a Cell_FACH state has been considered. The properties of a WTRU in a Cell_FACH state are quite different from those for a WTRU in a Cell_DCH state including the following:

The only uplink mechanism for Release 7 WTRUs in a Cell_FACH state is through a random access mechanism, over the random access channel (RACH);

The WTRUs autonomously update the UTRAN as to their cell location through CELL UPDATE and URA UPDATE procedures;

The WTRU can be configured for forward access channel (FACH) measurement occasions—these are periods during which the WTRU takes measurements on inter-radio access technology (RAT) and/or inter-frequency cells;

The WTRUs make the following physical layer measurements:

common pilot channel (CPICH) received signal code power (RSCP): The received signal code power measured on the primary CPICH; and CPICH Ec/No: The received energy per chip divided by the power density in the band. The CPICH Ec/No is defined as CPICH RSCP/UTRA Carrier received signal strength indicator (RSSI). The UTRA Carrier RSSI is not measured in Cell_FACH, but only in Cell_DCH. It is the received wide band power, including thermal noise and noise generated in the receiver, within the bandwidth defined by the receiver pulse shaping filter; and Physical layer measurements are reported to the UTRAN via layer 3 signalling through the Measured Results on RACH mechanism.

The measured results on RACH mechanism are designed to provide some feedback information to the UTRAN regarding the current state of the downlink. The mechanism may be controlled by the network, which broadcasts, as part of its system information in system information block 11 (SIB11) and SIB12, the information element (IE) "Intra-frequency reporting quantity for RACH Reporting". This IE tells all WTRUs in the cell the quantity to measure. The choices are highlighted in Table 1 below, along with the granularity of the reported quantity and the length of the coded information sent to the UTRAN.

TABLE 1

| Quantity | Determined by/from | Granularity | Size of Coded Information |
|---|---|---|---|
| CPICH RSCP | as measured by PHY layer | −120 to −25 dBm (in steps 1 dBm) | 7 |
| CPICH Ec/No | as measured by PHY layer | −24 dB to 0 dB (in steps of 0.5 dB) | 6 |
| Pathloss | Pathloss in dB = Primary CPICH Tx power-CPICH RSCP. Where Primary CPICH Tx power is found in the IE "Primary CPICH Tx power", and CPICH RSCP is as measured in PHY layer | 46 to 158 dB (in steps of 1 dB) | 7 |
| No report | | | 0 |

Referring to Table 1 above, a WTRU takes the appropriate measurements and reports these to the higher layers, (e.g., radio resource control (RRC)). In a Cell_FACH state, the base measurement period is 200 msec, but this can be higher if a FACH Measurement Occasion is configured for monitoring inter-frequency and inter-RAT cells. The accuracy of the measurement is defined to be ±6 dB for the current cell.

The information is sent to higher layers to be included in the IE "Measured results on RACH", in a number of RRC messages including: CELL UPDATE, RRC CONNECTION REQUEST, INITIAL DIRECT TRANSFER, UPLINK DIRECT TRANSFER, and MEASUREMENT REPORT messages. Unlike the majority of other measurements and quantities available at the RRC, those carried in the IE "Measured results on RACH" can not be filtered by the RRC prior to transmission.

The IE contains the configured measured quantity for the current cell and all other intra-frequency cells in the monitored set (the monitored set includes a list of cells that the UTRAN has told the WTRU to monitor). The IE may also contain the configured measured quantity for inter-frequency cells.

For RRC messages transmitted on a common control channel (CCCH), the maximum allowed message size should not be exceeded when forming the IE "Measured results on RACH". To achieve this, the WTRU may limit the number of included neighbor cells included in the report, or omit the IE "Measured results on RACH" altogether.

If HSDPA is to be used in a Cell_FACH state, the main problem is the lack of a dedicated uplink channel and the resulting absence of feedback. Without this information, the advantages of HSDPA are significantly reduced.

Several proposals addressed to solve the feedback issue have already been made. In one proposal, it has been proposed to transmit CQI information over:

The RACH transport channel either in preamble or message;
A new shared common uplink channels; and
Shared uplink code space.

However, the techniques described above require changes to the WTRU physical layer. As there is a strong push to limit these changes, it has been proposed to use the "Measured Results on RACH" mechanism to transmit channel quality information to the UTRAN. As the information is embedded in an RRC message IE, the UTRAN radio network controller (RNC) would need to forward the channel quality information to the Node-B so that it may perform its adaptive modulation and coding.

Using the "Measured Results on RACH" mechanism to provide channel quality feedback has a number of problems, however. For example:

1. The measured quantity (metric) that is fedback and subsequently used by the Node-B is either CPICH RSCP or CPICH Ec/No. Problems that may be associated with both these measures include:

1) RSCP only measures received power on a single code and does not provide any indication about the neighbour cell interference experienced by the WTRU.

2) Ec/No provides a ratio of the power received on the CPICH to the total received downlink power (CPICH Ec/No=CPICH RSCP/UTRA Carrier RSSI). As the denominator is the total received DL power, the range of the metric is somewhat reduced compared to a pure carrier/interference ratio. Additionally, the downlink received power (i.e., RSSI) is not necessarily measured in the Cell_FACH state. If it is not, then when making a CPICH Ec/No calculation, the physical layer uses the last calculated RSSI value while in Cell_DCH state. If a UE stays in Cell_FACH for an extended period of time, this value will be outdated, and the measure will be no better than the CPICH RSCP.

3) These measures fail to take into account the WTRU receiver capability. It is possible that for the same CPICH RSCP, WTRUs with different receiver architectures could support very different modulation, coding, and transport block sizes.

4) There is poor correlation between the RSCP and Ec/No and the actual CQI.

2. As WTRUs in Cell_PCH move across cell boundaries, the UTRAN refreshes their channel quality information based on information received in the CELL UPDATE message. If these WTRUs transition to Cell_FACH, the UTRAN will have up-to-date channel quality information which it can relay to the Node-B. On the other hand, as WTRUs in URA_PCH cross UTRAN routing area (URA) boundaries, they inform the network with a URA UPDATE message. As this message does not carry the IE "Measured Results on RACH", the network will typically have out-of-date channel quality information.

3. The quantities reported in the IE: "Measured Results on RACH" cannot be filtered at the WTRU RRC. As there is a latency between the instant the measurement is made and the time the Node-B is privy to this information, using non-averaged results may result in sub-optimum performance.

4. The Measured Results on RACH mechanism is currently controlled on a per-cell basis through information broadcast in the system information. As a result, all WTRUs in a cell are required to report the same information. This limits the flexibility of the reporting mechanism as the UTRAN may favor one measure over the other depending on the eventual use. For instance, the pathloss may be a better measure for cell reselection, but the CPICH Ec/No may be better for channel quality reporting.

SUMMARY

A method and apparatus for high speed downlink packet access link adaptation is disclosed. The method includes receiving a channel quality measurement metric over a Measured Results on random access channel (RACH) information element (IE). A link is adapted based upon the received channel quality metric

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
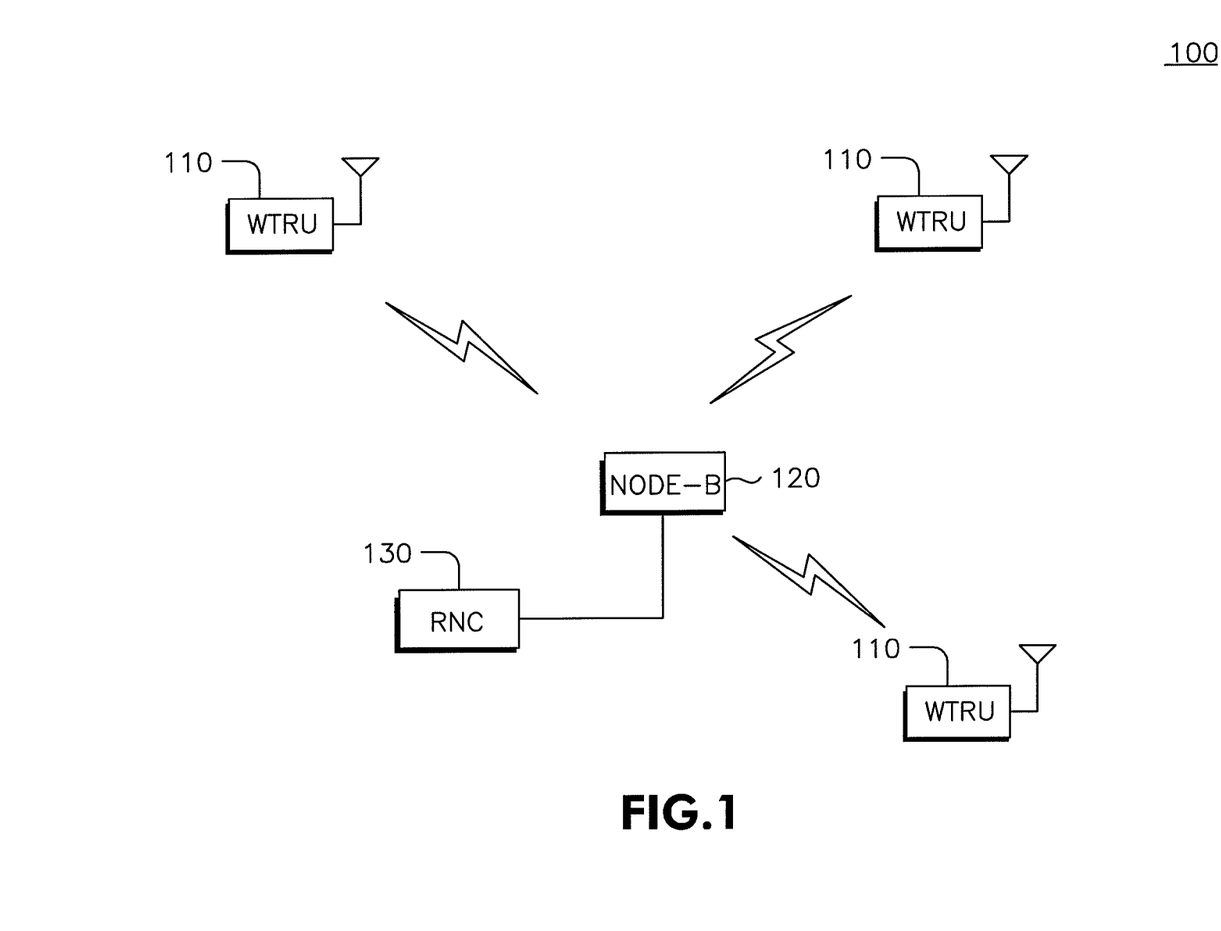
FIG. 1 shows an example wireless communication system including a plurality of WTRUs, a radio network controller (RNC), and a Node B.

FIG. 1 shows a wireless communication system 100 including a plurality of WTRUs 110 and a Node B 120. As shown in FIG. 1, the WTRUs 110 are in communication with the Node B 120. It should be noted that, although an example configuration of WTRUs 110 and Node B 120 is depicted in FIG. 1, any combination of wireless and wired devices may be included in the wireless communication system 100. In addition, an RNC 130 is in communication with the Node B 120.

Figure 2:
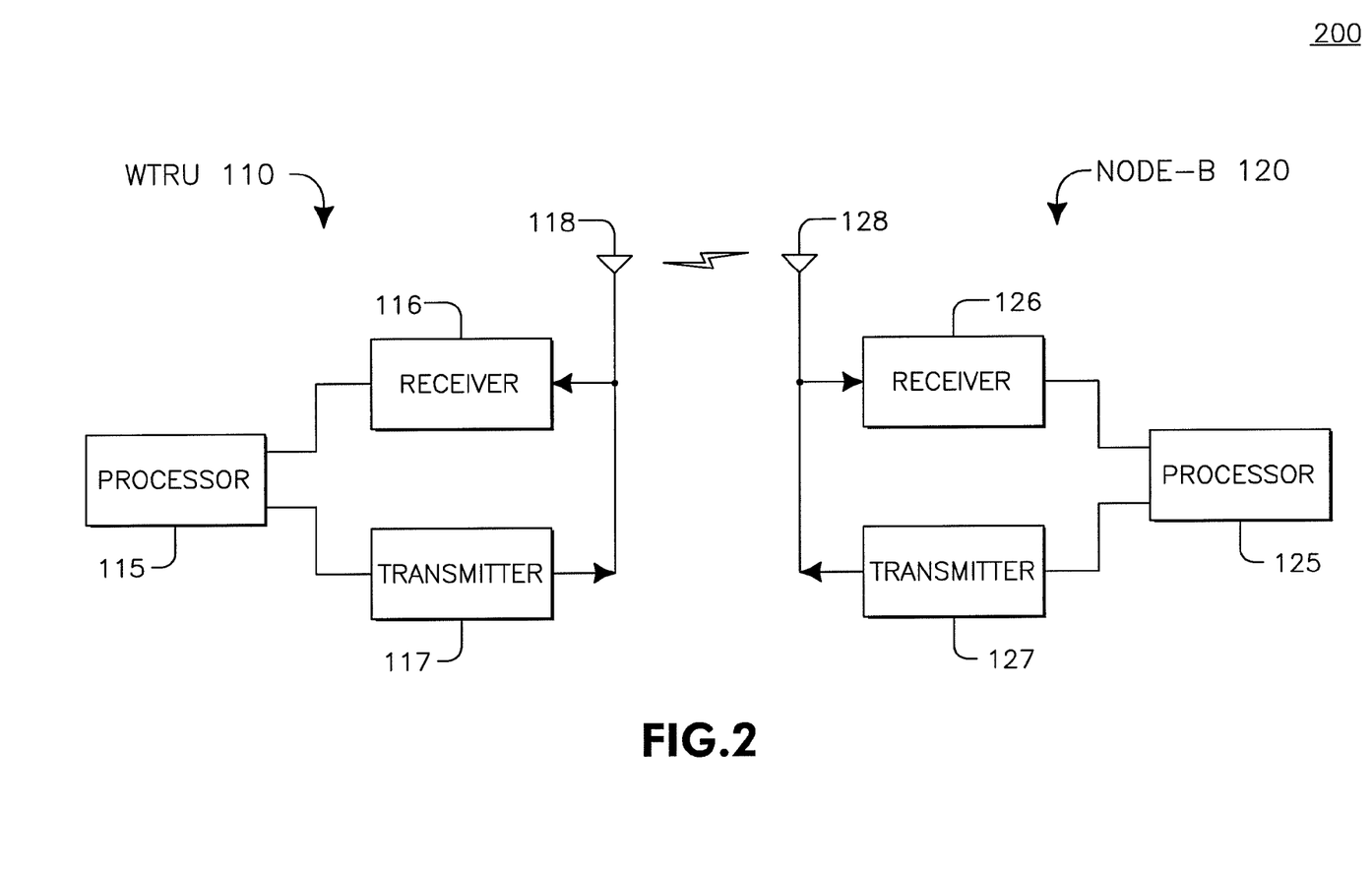
FIG. 2 is an example functional block diagram of a WTRU and the Node B of FIG. 1.

FIG. 2 is a functional block diagram 200 of a WTRU 110 and the Node B 120 of the wireless communication system 100 of FIG. 1. As shown in FIG. 2, the WTRU 110 is in communication with the Node B 120. The Node B 120 is configured to tailor HSDPA link adaptation, and the WTRU 110 provides channel quality feedback, (e.g., in the IE "Measured Results on RACH"), to aid the Node B 120 in performing link adaptation.

In addition to the components that may be found in a typical WTRU, the WTRU 110 includes a processor 115, a receiver 116, a transmitter 117, and an antenna 118. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical Node B, the Node B 120 includes a processor 125, a receiver 126, a transmitter 127, and an antenna 128. The processor 125 is configured to perform a method of HSDPA link adaptation. The receiver 126 and the transmitter 127 are in communication with the processor 125. The antenna 128 is in communication with both the receiver 126 and the transmitter 127 to facilitate the transmission and reception of wireless data.

Figure 3:
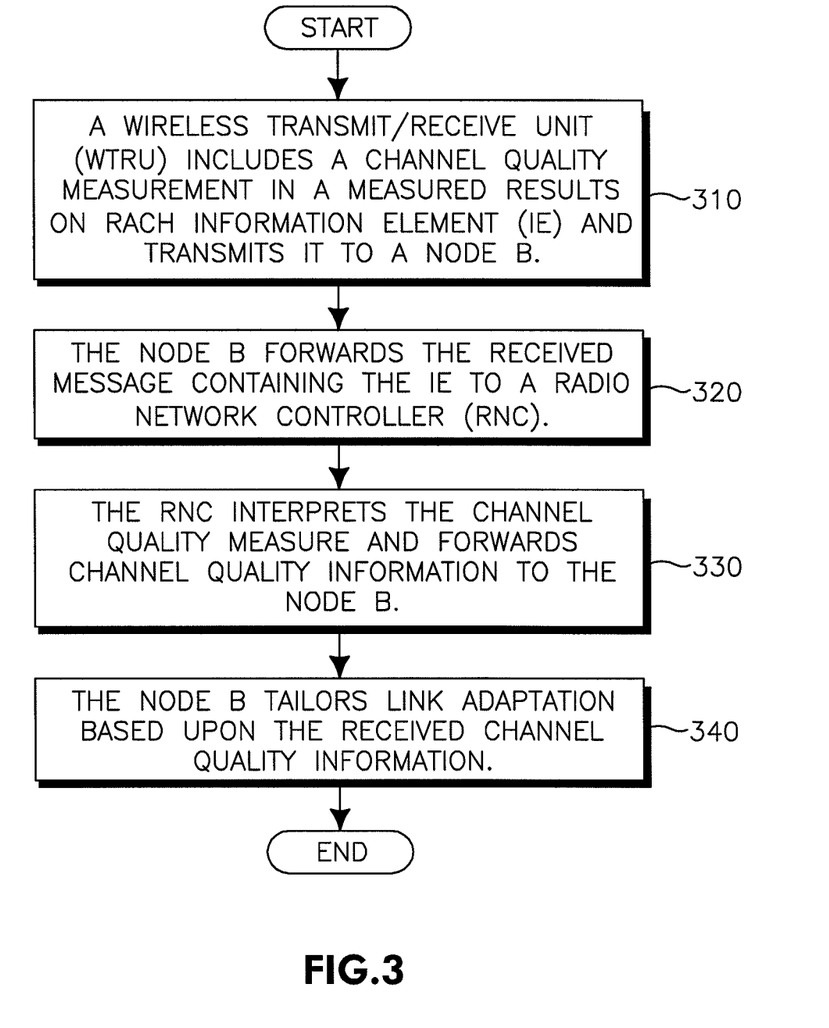
FIG. 3 is a flow diagram of a method of HSDPA link adaptation.

FIG. 3 is a flow diagram of a method 300 of HSDPA link adaptation. In step 310, the WTRU 110 includes a channel quality measurement metric in a Measured Results on RACH IE and transmits the channel quality measurement metric to the Node B 120. In one example, the channel quality measurement metric is included in radio resource controller (RRC) signalling.

The channel quality measurement metric that the WTRU 110 transmits may include a CPICH C/I based on parameters calculated in Cell_FACH, Cell_PCH, URA_PCH, and Idle states. For instance, the following may be defined:

$$\text{CPICH C/I} = \text{CPICH RSCP}/(\text{UTRA Carrier RSSI} - \text{CPICH RSCP}), \quad \text{Equation (1)}$$

where all units are in W. Additionally, a new measure may be defined taking into account the received signal code power, the total interference, and the WTRUs 110 capability.

Alternatively, existing measurements to the WTRU 110 channel quality measurement metrics may be modified and reported over the Measured Results on RACH IE. For example, the WTRU 110 calculated CQI may be forwarded to the higher layers as a measurement quantity and reported over the Measured Results on RACH IE or UTRA Carrier RSSI may be measured in the Cell_FACH state in order to improve the relevance of the CPICH Ec/No measure.

The Measured Results on RACH IE may be configured per WTRU 110 instead of per cell. Additionally, The WTRU 110 may send one or more channel quality metrics in the IE. The WTRU 110 may give priority to certain metrics. For example, for CCCH traffic, such as a CELL UPDATE message after a cell reselection, priority may be given the channel quality measurements that can aid link adaptation. Layer 3 filtering may also occur for any of the physical layer measurements described above.

Once the Node B 120 receives the message containing the IE, it forwards it to the RNC 130 (step 320) where the RNC interprets the channel quality measurement metric and forwards channel quality information back to the Node B 120 (step 330). The Node B may then tailor link adaptation based upon the channel quality information (step 340). Additionally, the Node B 120 may tailor the link adaptation based upon the type of filtering allowed for the WTRU 110 reported channel measure.

Additionally, in order to address WTRUs 110 that are in URA_PCH and subsequently transitioning to Cell_FACH, the Measured Results on RACH IE may be included in the URA UPDATE message. As neighboring cell measurements have less relevance in URA_PCH, the WTRU 110 may be hardcoded to only report measurement quantities based on the current cell, whether it be an existing measurement or a new measurement.

Any of the measurements that are reported by the WTRU 110, existing or new, may be synchronized with the WTRUs 110 FACH Measurement Occasions and/or any discontinuous reception (DRX) cycle currently defined in Cell_FACH state, Cell_PCH state, URA_PCH state or idle mode, This can be achieved by matching the measurement period to a multiple of the DRX cycle.

Alternatively, synchronization may be achieved by WTRU 110 measuring the reported quantity at the next opportunity provided by the DRX cycle following the expiration of the measurement period. For instance, if the measurement period is set to 300 ms, while the DRX cycle repeats itself every 200 ms, and if the last measurement took place during the last opportunity provided by the DRX cycle (t=0 ms), the WTRU 110 would measure at t=400 ms instead of t=300 ms.

In addition, the list of RRC messages that include the IE "Measured Results on RACH" may be expanded. For example, the IE may be included in any of the following messages: UE CAPABILITY INFORMATION, COUNTER CHECK, RADIO BEARER SETUP COMPLETE, TRANSPORT CHANNEL RECONFIGURATION COMPLETE, PHYSICAL CHANNEL RECONFIGURATION COMPLETE, UTRAN MOBILITY INFORMATION CONFIRM, or any other messages.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of high speed downlink packet access (HSDPA) link adaptation implemented in a wireless transmit/receive unit (WTRU), comprising:
   a WTRU in a Cell_FACH state performing a channel quality metric measurement in synchronization with a discontinuous reception (DRX) cycle configured for Cell_FACH during which the network is not sending data to the WTRU and while the WTRU is configured to receive a high speed downlink shared channel (HS-DSCH) from a network; and
   the WTRU transmitting a radio resource control (RRC) message including the channel quality metric measurement, wherein the channel quality metric measurement is included in a Measured Results on random access channel (RACH) information element (IE) of the RRC message.

2. The method of claim 1 wherein the channel quality metric measurement is based on a universal terrestrial radio access (UTRA) carrier received signal strength indication (RSSI) measured in a Cell_FACH state.

3. The method of claim 1 wherein the channel quality metric measurement is based on a Channel Quality Indication (CQI) calculated by a physical layer of the WTRU.

4. The method of claim 1 wherein the channel quality metric measurement is based on a common pilot channel carrier to interference ratio (CPICH C/I).

5. The method of claim 1 wherein the channel quality metric measurement is based on any one of the following factors: received signal code power, total interference, and capability of the WTRU.

6. The method of claim 1 wherein a plurality of channel quality metric measurements are transmitted over the Measured Results on RACH IE.

7. The method of claim 1 wherein a channel quality metric measurement period is matched to a multiple of the DRX cycle.

8. The method of claim 1 further comprising:
   performing the channel quality metric measurement at a next opportunity provided by the DRX cycle following an expiration of a measurement period.

9. The method of claim 1 further comprising:
   the WTRU performing Inter-frequency or Inter-radio access technology (RAT) measurements.

10. A wireless transmit/receive unit (WTRU), comprising:
    a receiver;
    a transmitter; and
    a processor in communication with the receiver and the transmitter, the processor configured to perform a channel quality metric measurement in a Cell_FACH state in synchronization with a discontinuous reception (DRX) cycle configured for Cell_FACH during which the network is not sending data to the WTRU and while the WTRU is configured to receive a high speed downlink shared channel (HS-DSCH) from a network, and transmit a radio resource control (RRC) message including the channel quality metric measurement, wherein the channel quality metric measurement is included in a Measured Results on random access channel (RACH) information element (IE) of the RRC message.

11. The WTRU of claim 10 wherein the channel quality metric measurement is based on a universal terrestrial radio access (UTRA) carrier received signal strength indication (RSSI) measured in a Cell_FACH state.

12. The WTRU of claim 10 wherein the channel metric measurement is based on any one of the following factors: received signal code power, total interference, and capability of the WTRU.

13. The WTRU of claim 10 wherein the channel quality metric measurement is based on a common pilot channel carrier to interference ratio (CPICH C/I).

14. The WTRU of claim 10 wherein a WTRU channel quality metric measurement period is matched to a multiple of the DRX cycle.

15. The WTRU of claim 10 wherein the processor is further configured to perform the channel quality metric measurement at a next opportunity provided by the DRX cycle following an expiration of a measurement period.

16. The WTRU of claim 10 wherein the channel quality metric measurement is based on a Channel Quality Indication (CQI) calculated by a physical layer of the WTRU.

17. The WTRU of claim 10 wherein a plurality of channel quality metric measurements are transmitted over the Measured Results on RACH IE.

\* \* \* \* \*

UNITED STATES PATENT AND TRADEMARK OFFICE
CERTIFICATE OF CORRECTION

| | |
|---|---|
| PATENT NO. | : 8,902,763 B2 |
| APPLICATION NO. | : 12/048797 |
| DATED | : December 2, 2014 |
| INVENTOR(S) | : Rocco DiGirolamo, Paul Marinier and Christopher R. Cave |

It is certified that error appears in the above-identified patent and that said Letters Patent is hereby corrected as shown below:

Title Page in the References Cited, Foreign Patent Documents, page 2, Col. 1, item (56), "WF 2005/048529" should be replaced with --WO 2005/048529--.

Signed and Sealed this
Fifth Day of May, 2015

Michelle K. Lee
*Director of the United States Patent and Trademark Office*